United States Patent [19]
Dinkelacker

[11] Patent Number: 6,092,068
[45] Date of Patent: Jul. 18, 2000

[54] MARKED DOCUMENT TUTOR

[75] Inventor: James Walter Dinkelacker, Los Altos, Calif.

[73] Assignee: Netscape Communication Corporation, Mountain View, Calif.

[21] Appl. No.: 08/914,041

[22] Filed: Aug. 5, 1997

[51] Int. Cl.[7] .............................. G06T 1/00; G09G 5/36
[52] U.S. Cl. ............................. 707/100; 345/337
[58] Field of Search ........................... 707/100, 101–104, 707/505–513, 532, 201–205, 526, 500; 345/326, 333, 352, 353, 347; 709/201, 200

[56] References Cited

U.S. PATENT DOCUMENTS 5,535,422   7/1996   Chiang et al. ........................... 395/155
5,893,131   4/1999   Kornfeld .................................. 707/531

*Primary Examiner*—Joseph H. Feild
*Assistant Examiner*—Alford W. Kindred
*Attorney, Agent, or Firm*—Michael A. Glenn

[57] ABSTRACT

A mechanism is provided for revealing the marked structure of a document, e.g. a document written in HTML, such that a person reviewing the document is instructed in the operation and recreation of the document from a casual on-screen review of the document. During operation of the invention, an input file is first read. The file is parsed into markers, e.g. HTML tags, during input. A vector is built of all markers, including the function and location of the markers. For each marker, a glossary is accessed to determine what the marker is and what the marker does. Depending upon the mode of operation selected by the user, the invention can provide a learn mode in which a "mouse-over" trigger is generated for each marked section, e.g. a JavaScript mouse-over, a NetHelp trigger, or layers for each marking; and provide a performance support mode in which display units, e.g. layers, are generated for each marking and displayed for each marking. In this way, a resident tutor is provided that instructs a person reviewing a marked document both in the function of the markings within the context of the document, and in the basic purpose of each marking in generic terms (e.g. a tutorial on the use, syntax, and function of such markings).

17 Claims, 3 Drawing Sheets

MARKED DOCUMENT TUTOR

BACKGROUND OF THE INVENTION

1. Technical Field

The invention relates to electronic documents. More particularly, the invention relates to marked electronic documents.

2. Description of the Prior Art

A marked document is any electronic document that allows some form of processing over and above generic (i.e ASCII) text. A simple example of a marked document is a document that includes bold or italic text. In such case, the text that appears bold or italic is marked as bold or italic. However, there are other functions that document markings may perform. For example, a document marking may create style sheets or headings or footers. A further example of a content element can include an invisible time and date stamp. Thus, a set of markings can either provide stylistic elements (such as bold or italic text) or it can provide other content elements (such as headers or footers). One disadvantage of marked documents, such as those documents written in the hypertext markup language (HTML) or standardized general markup language (SGML), is that the meaning and/or function markings in marked portions of the document is not often readily discernible, even to a skilled person, except to the author thereof. Further, there is no way for a person reviewing such documents to develop insight and understanding of the document structure and function, even with some knowledge of the document's general purpose, absent some rudimentary understanding of the generic meaning of the various tags used in the document. That is, the purpose and rationale behind the various marking in the document is generally not self explanatory, nor is there an explanation of the proper use and function of the various marking for one who is unskilled in the use of such markings.

While intelligent tutoring systems are known (see Wenger et al), such systems are concerned primarily with the general domain of tutoring, where emphasis is placed upon authoring, and where the focus is on the preparation and presentation of lessons or modules to facilitate learning. Such electronic textbooks are not helpful in the context of performance support, e.g. where a marked document must be reviewed and understood by a person without previous exposure to the document and, perhaps, without any experience in the syntax and meaning of markings contained within the document.

Code profilers are also known, but the techniques embodied in such systems function in accordance with known syntactic rules. Such systems are not interactive, and are thus of little interest in connection with providing a tutorial environment. Further, such systems do not provide performance support.

Such techniques as "tool tips" or "balloon help" provide areas within a display that are sensitive to a mouse-over gesture, and that provide some additional information responsive thereto. However, such techniques merely provide an statement that is embedded in the application in use ahead of time, i.e. when the application is written. Such techniques do not provide a true sense of interactivity, nor is there any provision for performance support. Likewise, the provision of a status bar, for example which contains dictionary information, is not useful when a document marking is encountered because merely providing access to a reference text does not interactively instruct a person about the document itself.

It would be advantageous to provide a mechanism for revealing the marked structure of a document, e.g. a document written in HTML, such that a person reviewing the document is instructed in the operation and recreation of the document from a casual on-screen review of the document.

SUMMARY OF THE INVENTION

The invention provides a mechanism for revealing the marked structure of a document, e.g. a document written in HTML or SGML, such that a person reviewing the document is instructed in the operation and recreation of the document from a casual on-screen review of the document. During operation of the invention, an input file is first read. The file is parsed into markers, e.g. HTML tags, during input. A vector is built of all markers, including the function and location of the markers. For each marker, a glossary is accessed to determine what the marker is and what the marker does. Depending upon the mode of operation selected by the user, the invention can:

Provide a learn mode in which a "mouse-over" trigger is generated for each marked section, e.g. a JavaScript mouse-over, a NetHelp trigger, or layers for each marking;

Provide a performance support mode in which display units, e.g. layers, are generated for each marking and displayed for each marking.

In this way, the invention provides a resident tutor that instructs a person reviewing a marked document both in the function of the markings within the context of the document, and in the basic purpose of each marking in generic terms (e.g. a tutorial on the use, syntax, and function of such markings).

DETAILED DESCRIPTION OF THE INVENTION

Figure 1:
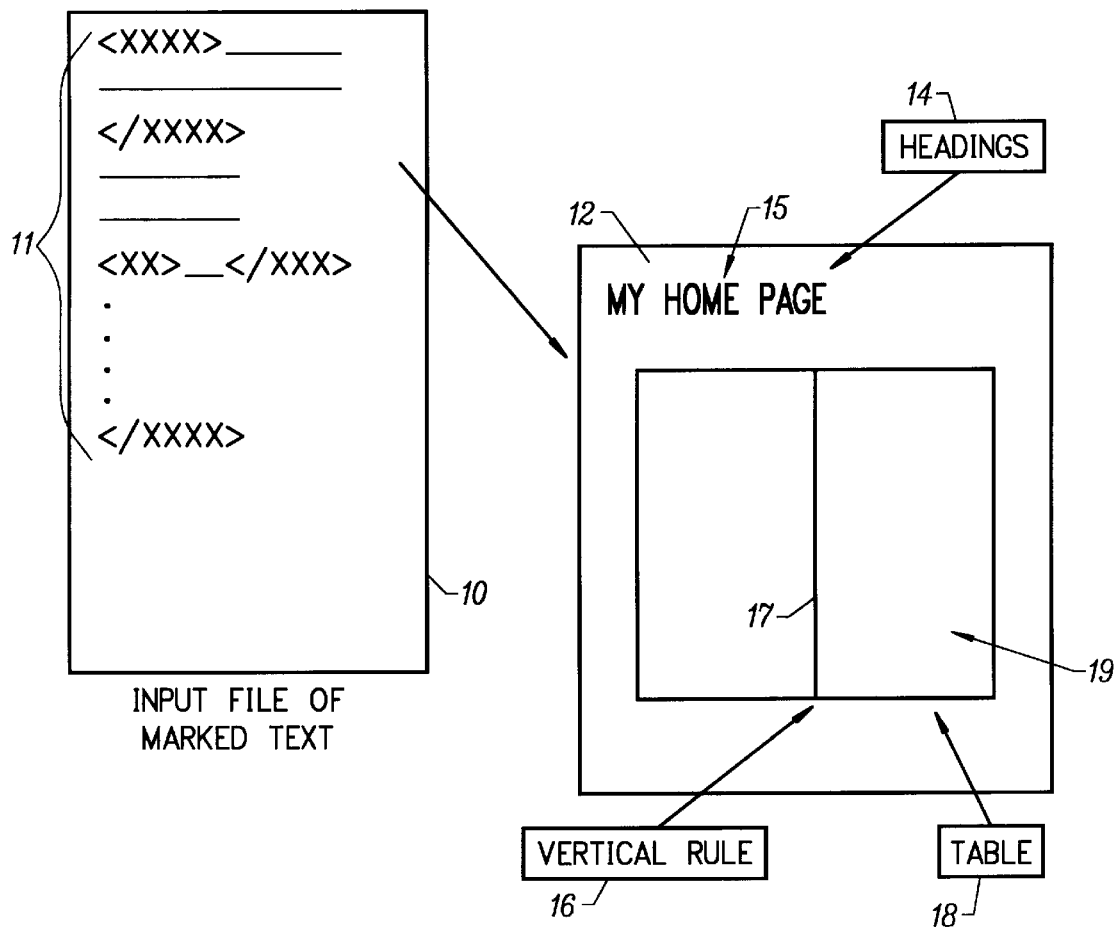
FIG. 1 is a block schematic diagram showing an input file of marked text and a corresponding document.

One key feature of the invention provides a way in which an individual may work with a document that the individual has not seen before, where invention makes it possible to reveal to the individual various elements of the document of a stylistic nature, or that comprise hidden content. For example, one may mouse-over a footer and information is provided indicating that this is indeed a footer, as well as the style and content of the footer. Uniquely, the invention provides this capability based, in part, upon the use of certain principles generally associated with tutoring systems.

Tutoring systems typically work from an authoring standpoint, i.e. allowing creation a set of lessons for people to follow. The approach herein is substantially different from a typical tutoring system, however, in that the invention provides a system which loads or reads a file, and then works through the file to identify marked content to thereby allow the user to access any marked content, related annotations, and other information relevant to the marked content that the document contains. Thus, the invention provides a system that is a dynamic tutoring system, in that it reveals information about a document that the tutoring system itself has never before seen.

Similar to the mouse-over gesture that allows information underneath marked text to be revealed, such as a heading tag, the user may also click on the marked text to access a library, for example of industry standard tags, that contains more information. For example, the invention provides a tutorial system that indicates, e.g. that the marked text is an HTML H1 heading (commonly there are six levels of headings in HTML). The system then displays information that instructs the user in how to make an H1 heading, e.g. by following a particular sequence.

One value of the invention is that individuals are able to learn much more quickly how to duplicate document content that has already been created by another, as well as to learn how such content is made, without necessarily having to delve into the document in great detail. For example, one might look at text or other features on a page and decide that, although the document includes features that look familiar, it is not clear how the margins were produced on the document. According to the invention, mousing over the margins could reveal a style sheet tag. One could then click on the tag, load a particular element of the style sheet, e.g. a command in HTML that uses cascading style sheets, and then know how the margins were produced.

Thus, the invention provides a mechanism for revealing the marked structure of a document, e.g. a document written in HTML, RTF, or SGML, such that a person reviewing the document is instructed in the operation and recreation of the document from a casual on-screen review of the document.

During operation of the invention, an input file is first read. The file is parsed into markers, e.g. HTML tags, during input. A vector is built of all markers, including the function and location of the markers. For each marker, a glossary is accessed to determine what the marker is and what the marker does. Depending upon the mode of operation selected by the user, the invention can:

Provide a learn mode in which a "mouse-over" trigger is generated for each marked section, e.g. a JavaScript mouse-over, a NetHelp trigger, or layers for each marking;

Provide a performance support mode in which display units, e.g. layers, are generated for each marking and displayed for each marking.

In this way, the invention provides a resident tutor that instructs a person reviewing a marked document both in the function of the markings within the context of the document, and in the basic purpose of each marking in generic terms (e.g. a tutorial on the use, syntax, and function of such markings).

FIG. 1 is a block schematic diagram showing an input file of marked text and a corresponding document. The input file 10 includes various lines of text and markers 11. When the file is displayed, for example where the file is an HTML file and document display involves the use of a browser, a formatted page 12 is presented that includes a heading 15, i.e. MY HOME PAGE, which is denoted in the input file as a heading by a heading marker 14. The page may also include, for example, a table 19 having a vertical rule 17, where the table is denoted in the input file as a table by a table marker 18 and the vertical rule is denoted in the input file as a vertical rule by a vertical rule marker 16. There is presently no way to view the document as a formatted page and discover the underlying document markers, nor the function and use of such markers.

Figure 2:
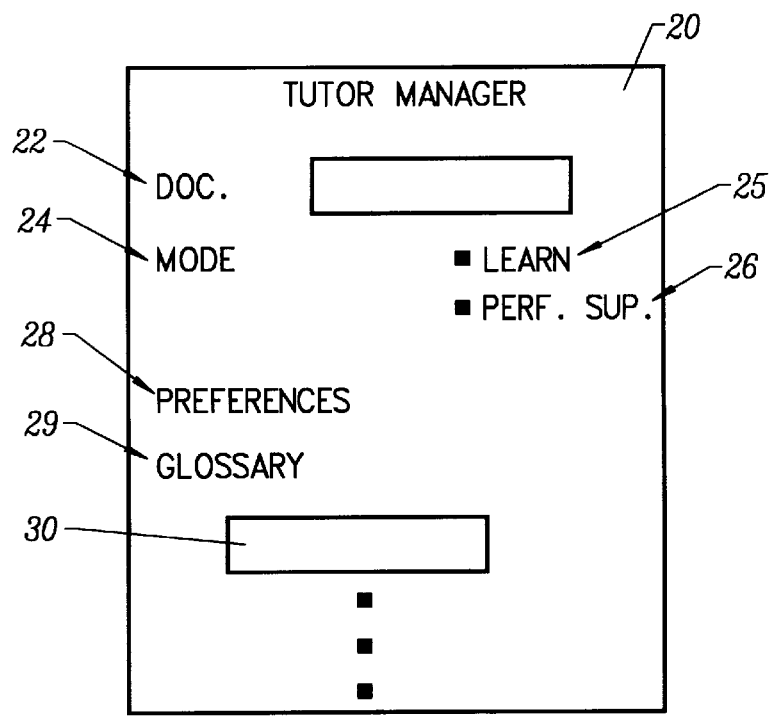
FIG. 2 is a schematic representation of a graphic user interface for a marked tutor according to the invention.

FIG. 2 is a schematic representation of a graphic user interface for a marked tutor according to the invention. The marker tutor is accessible through a tutor manager 20 that includes a document field 22 which identifies the document of interest, and a user activated mode switch 24 that allows the user to select between a learn mode 25 and a performance support mode 26. As discussed above, the learn mode enables a mouse-over display for each marked object in the document, while the performance support mode enables a layered display for each marking, e.g. a first level display that consists of annotations for the marking, and one or more next level displays that consist of more detailed information concerning the marking, e.g. a tutorial. The various layers provided by the performance support mode are accessed through any of various user gestures, e.g. mouse-over, mouse click, and keyboard commands.

Figure 3:
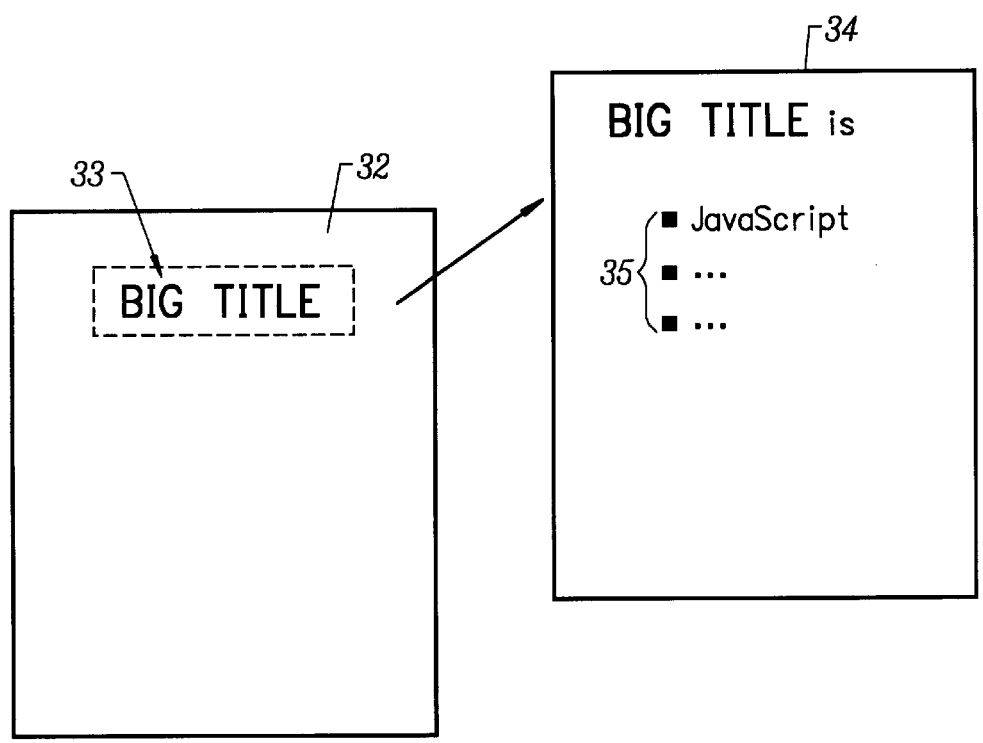
FIG. 3 is a block schematic diagram of a tutor session according to the invention.

FIG. 3 is a block schematic diagram of a tutor session according to the invention. During the session, a user may mouse-over a document 32 that contains, for example a title 33. As a result of the user gesture, a display window 34 is opened that provides annotations or tutorial information 35 regarding the title.

Figure 4:
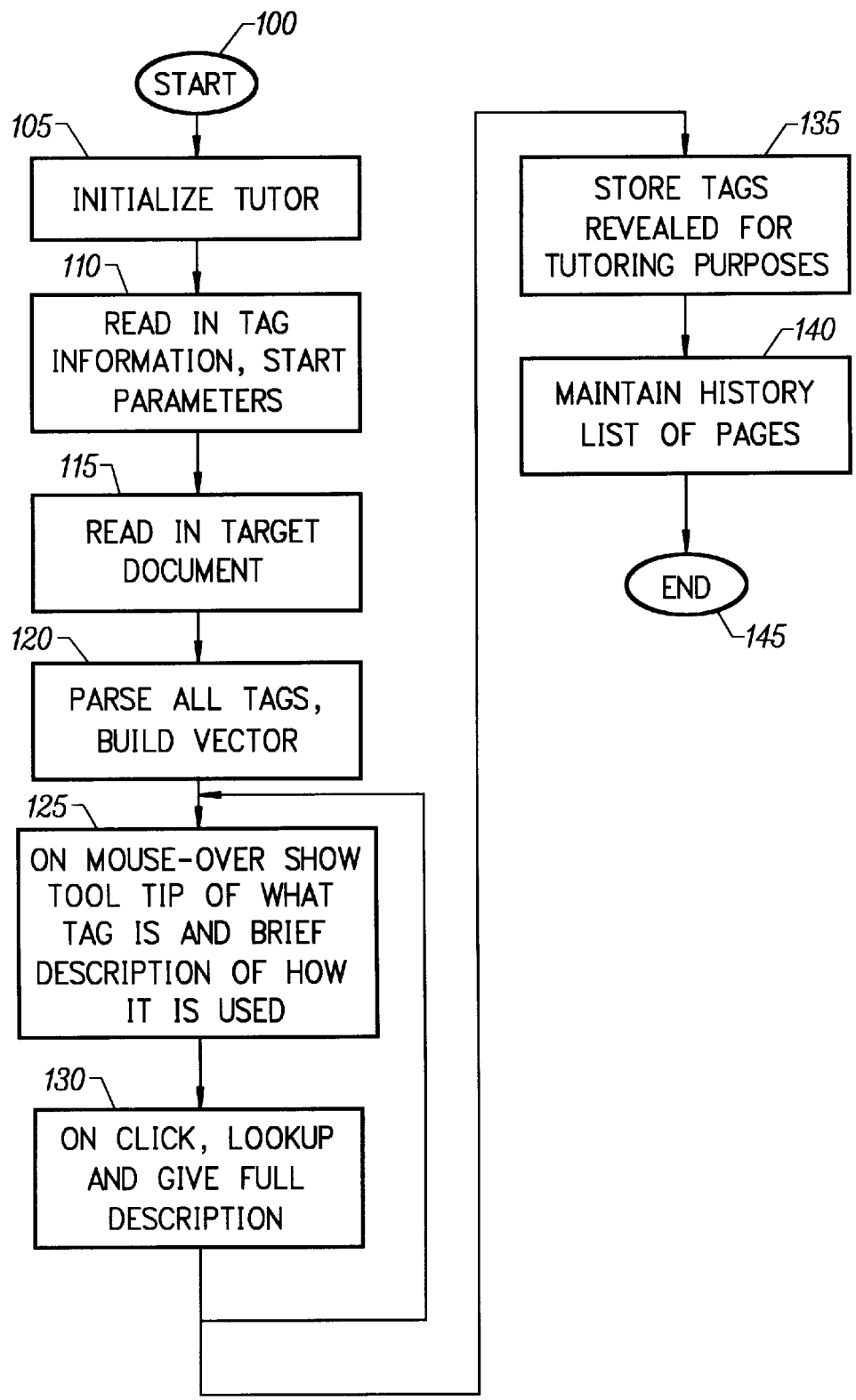
FIG. 4 is a flow diagram showing operation of a marked tutor according to the invention.

FIG. 4 is a flow diagram showing operation of a marked tutor according to the invention. At the start of document processing (100), the tutor is initialized (105). Initialization involves, for example, loading user preferences and appending various dictionaries, glossaries, and other reference material to the tutor. The tutor then reads in tag information and start parameters that are to be applied to the target file for the document (110). The initialization and parameter files are extensible and modifiable. For example, the system may provide a parameter file for HTML, for Wordperfect, for Microsoft Word, for Rich Text Format, or any other document format for any text that is tagged for some purpose of human communication or indexing, or for any instance where the system must control a document for the human usage, rather than for the system's usage, as would be the case in a compiler.

Next, the target document itself is read into the tutor (115) and the tutor parses all tags and builds a vector of all tags or markers (120). While the document is being parsed, links may be established between the vector that holds the tags from the newly read in document to all those tags that are currently held in a look up table that may be reviewed later. This operation may proceed as a background task. The relationship between the vector created from the document and the initialization tag information may be created by the use of straight pointer links, by hash value look ups, or by any other appropriate technique. The key consideration is that a vector is made of the marked content in the document, as well as byte locations within the document information stream, when the document is read.

Once the document is parsed, a user may access the document. On mouse-over, the tutor shows various information related to a tag associated with the mouse-over region. For example, a tool tip may be displayed describing the tag and giving a brief description of how the tag is used (125) (see FIG. 3). If the user desires more information on the tag, he may click the mouse, and the tutor provides a full description of the tag (130). Clicking may also bring up a menu of various options, such a tag information, HTML tutorial, and on-line help. The foregoing may be an iterative process, where a user may proceed through a document and view information about any marked text within the document.

If desired, the system may be set to instruct the display to highlight those areas that produced the vector, i.e. the marked areas of the document. Thus, instead of merely mousing-over various portions of a displayed page of a document, the user could in fact see the areas that are highlighted and then select only those portions of marked text that they wanted to know more about. It should be appreciated that such highlighting may be accomplished in any of several known ways, e.g. placing a shadowbox around the highlighted elements or changing the background. Another embodiment of the invention extends tutorial systems to provide more than help and performance support, e.g. by providing a practice session.

During a tutoring session, i.e. during user access to a document via the tutor, various audit information may be captured. For example, the tutor may store all tags that were revealed during a tutor session (135) and maintain a history of those pages that were accessed via the tutor (140). Once the user is through viewing the document through the tutor, the tutor session is over (145).

One embodiment of the invention provides a performance support only mode, in which all tutorial aspects of the system are turned off. Another embodiment of the invention provides a tutorial only mode, in which the performance support feature of the invention is turned off. Thus, the invention may be configured as desired to operate in any of two or more modes e.g. by setting one simple flag to either turn on or off, one or both of either the performance support mode or the tutorial mode.

The preferred embodiment of the invention provides two editing features, i.e. editing of initialization and parameter information, and editing of the document itself as it is being viewed. It is presently preferred that the definition and parameter file be in plain text, such that it is not necessary to provide a special tool to edit the parameter files. This does not to preclude the provision of special tools that simplify the process, e.g. through the use of open frames or open windows. With regard to editing documents themselves, the invention does not require a user apply the entire tutorial system as a corrective tool on a document that has already been viewed.

For example, one might review a document and realize that there is a heading, for example of a particular tag and by a particular set of style guidelines, and wish to change all of these tags into H3 tags. Everything needed to perform this action is known by the tutor because the tutor only needs to what the tag is, and where that tag is located. Through the parsing process, all tags are known in terms of their byte count location in the file. Thus, one embodiment of the invention provides an edit dialog for such purpose.

Another embodiment of the invention provides a status bar for disclosing tutor and/or parsing related information, for example information a document or about the position of a mouse cursor. For example, if one uses a coding program for a personal computer, such as the Macintosh, information may be set to the status bar to indicate the time (which is not necessarily related to the tutoring session), to indicate where the cursor (which is related to the tutoring session), or to indicate what the byte count (which is related specifically to document content). In this way, the invention may encompass more than the document itself, by may comprehend an adjunct user interface that incorporates the above described tutoring functions into a broader set of tools, such as editing tools.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for revealing a document's marked structure, comprising the steps of:

inputting a file that is representative of said document;

parsing said file to identify marked content, said parsing step comprising the steps of:
    providing a look up table;
    parsing said file into markers;
    building a vector of all markers, said vector comprising the function and location of each of said markers; and
    establishing links between a vector that holds the tags from a newly read in document to all those tags that are currently held in a look up table, while the document is being parsed,
    wherein said vector is made of marked content in said document, and locations within a document information stream, when said document is read;

accessing said marked content, said accessing step comprising the step of:

accessing a glossary for each marker to determine what each marker is and what each marker does; and presenting said document on a display and providing instructions indicating marked structure in said document;

wherein an interface is provided such that a person reviewing said document is instructed in the operation and recreation of said document from a casual on-screen review of said document.

2. The method of claim 1, further comprising the step of:
using a mouse-over gesture to allow information underneath marked text to be revealed.

3. The method of claim 1, further comprising the step of:
clicking on marked text in said document to access a library that contains more information.

4. The method of claim 1, wherein a person reviewing said document is instructed in the operation and recreation of said document from a casual on-screen review of said document.

5. The method of claim 1, further comprising the step of:
providing a learn mode in which a trigger is generated for each marked section.

6. The method of claim 1, further comprising the step of:
providing a performance support mode in which display units are generated for each marking and displayed for each marking.

7. The method of claim 1, wherein a resident tutor is provided that instructs a person reviewing a marked document both in the function of said markings within the context of said document, and in the basic purpose of each marking in generic terms.

8. The method of claim 1, further comprising the step of:
providing a tutor manager that comprises a document field which identifies a document of interest, and a user activated mode switch that allows a user to select between a learn mode and a performance support mode, wherein said learn mode enables a display for each marked object in said document, and said performance support mode enables a layered display for each marking and one or more next level displays that consist of more detailed information concerning said marking.

9. The method of claim 1, further comprising the step of:
loading user preferences and appending various dictionaries, glossaries, and other reference material during system initialization.

10. An apparatus for revealing a document's marked structure, comprising:
- an input adapted to receive a file that is representative of said document;
- a parser for identifying marked content in said file, said parser comprising:
  - means for parsing said file into markers;
  - means for building a vector of all markers, said vector comprising the function and location of each of said markers;
  - wherein links are established between a vector that holds the tags from the newly read in document to all those tags that are currently held in a look up table, while the document is being parsed;
  - wherein said vector is made of marked content in said document, and locations within a document information stream, when said document is read;
- an interface for user access to said marked content; and
- means for accessing a glossary for each marker determine what each marker is and what each marker does.

11. An apparatus for revealing a document's marked structure, comprising:
- a look up table;
- an input adapted to receive a file that is representative of said document;
- a parser for identifying marked content in said file, said parser comprising:
  - means for parsing said file into markers;
  - means for building a vector of all markers, said vector comprising the function and location of each of said markers;
  - wherein links are established between a vector that holds the tags from a newly read in document to all those tags that are currently held in a look up table, while the document is being parsed;
  - wherein said vector is made of marked content in said document, and locations within a document information stream, when said document is read;
- an interface for user access to said marked content;
- means for accessing a glossary for each marker to determine what each marker is and what each marker does;
- a display for presenting said document and for providing instructions indicating marked structure in said document;
- wherein an interface is provided such that a person reviewing said document is instructed in the operation and recreation of said document from a casual on-screen review of said document.

12. The apparatus of claim 11, wherein use of a mouse-over gesture allows information underneath marked text to be revealed.

13. The apparatus of claim 11, wherein clicking on marked text in said document allows access to a library that contains more information.

14. The apparatus of claim 11, a learn mode is provided in which a trigger is generated for each marked section.

15. The apparatus of claim 11, wherein a performance support mode is provided in which display units are generated for each marking and displayed for each marking.

16. The apparatus of claim 11, wherein a resident tutor is provided that instructs a person reviewing a marked document both in the function of said markings within the context of said document, and in the basic purpose of each marking in generic terms.

17. The apparatus of claim 11, further comprising:
- a tutor manager that comprises a document field which identifies a document of interest, and a user activated mode switch that allows a user to select between a learn mode and a performance support mode, wherein said learn mode enables a display for each marked object in said document, and said performance support mode enables a layered display for each marking and one or more next level displays that consist of more detailed information concerning said marking.

* * * * *